MAGNETIC DISC STORAGE DEVICE

Filed March 21, 1961 4 Sheets-Sheet 1

INVENTOR.
ROBERT C. KELNER
ROBERT T. PEARSON
BY ROGER K. LEE, JR.
ASCHER H. SHAPIRO

Philip J. McFarland
ATTORNEYS

MAGNETIC DISC STORAGE DEVICE

Filed March 21, 1961

INVENTORS
ROBERT C. KELNER
ROBERT T. PEARSON
ROGER K. LEE, JR.
ASCHER H. SHAPIRO
BY Philip J McFarland
ATTORNEYS

MAGNETIC DISC STORAGE DEVICE

INVENTORS
ROBERT C. KELNER
ROBERT T. PEARSON
BY ROGER K. LEE, JR.
ASCHER H. SHAPIRO

Philip J. McFarland
ATTORNEYS

*INVENTORS*
ROBERT C. KELNER
ROBERT T. PEARSON
ROGER K. LEE, JR.
ASCHER H. SHAPIRO
*BY* Philip J. McFarland
ATTORNEYS United States Patent Office 3,225,338
Patented Dec. 21, 1965

3,225,338

MAGNETIC DISC STORAGE DEVICE

Robert Kelner, Concord, Robert Pearson, Beverly, Roger K. Lee, Watertown, and Ascher H. Shapiro, Arlington, Mass., assignors to Laboratory for Electronics, Inc., Boston, Mass., a corporation of Delaware Filed Mar. 21, 1961, Ser. No. 97,303
9 Claims. (Cl. 340—174.1)

This invention relates in general to the storage of information on a magnetizable surface and more particularly pertains to a storage unit employing a rotating flexible disc arranged to maintain a precise spacing from the magnetic heads utilized to write on and read information from the disc's magnetic surface.

This application is a continuation in part of our application entitled "Magnetic Disc Storage Device," Serial No. 25,995, filed May 2, 1960 now U.S. Patent No. 3,110,-889.

The invention is an improvement upon the magnetic disc information storage device disclosed in the co-pending application of Robert T. Pearson and William J. Gorman, Serial No. 853,373, filed November 16, 1959 now abandoned. That device employs a thin flexible disc having an iron oxide coating on one face which can be magnetized by a transducer head. The flexible disc is attached to a rotatable shaft. A back plate having a flat surface in which a number of transducer heads for reading and writing are embedded, is positioned near the coated surface of the whirling disc. The rotational speed of the disc and its proximity to the back plate causes the flexible disc to assume a radial position with respect to the coacting backplate which is well suited to general magnetic storage applications.

Specifically, the flexible disc of the storage device is clamped between two flanges at least one of which is secured to a rotatable shaft. Because the flexible disc is very thin, it does not support its own weight when it is not being rotated and consequently appears quite limp when at rest. The shaft is mounted so that the disc is located in close proximity to a flat stabilizing back plate in which magnetic transducer read-write elements are embedded flush with the smooth surface. The back plate has a central depression to receive the outside flange, the space between the flange and the wall of the depression serving as a control manifold. An air inlet orifice is located so as to permit air to enter the manifold and flow between the rotating disc and the stabilizing plate.

The disc is rotated in an environmental fluid which may be a gas or a mixture of gases such as air, the rotation being at a uniform angular velocity about an axis perpendicular to the plane of the disc. The layer of fluid near the disc is set into motion by frictional forces and is impelled away from the axis of rotation by centrifugal forces. This results in a compensating axial flow of fluid toward the disc. Thus, three dimensional fluid flow is produced in which velocity components exist in the radial, circumferential, and axial directions. As the disc's rotating surface is brought into closer proximity to the stationary surface of the back plate, the axial flow is reduced and a resultant decrease in pressure occurs in the space between the rotating and stationary surfaces. The magnitude of the differential pressures is determined by the velocity gradient generated by the rotating surface. A controlled amount of fluid is allowed to enter the space between the two surfaces through the centrally located manifold to replace the reduced axial supply, the resulting operation becomes comparable to that of an inefficient centrifugal fan or pump. Since the rotating surface is a thin flexible membrane, it becomes stressed axi-symmetrically by the action of centrifugal forces and remains sensitive to its surrounding force fields when subject to rotational forces. Thus, when the disc is rotating close to the smooth surface of the back plate, a decrease in pressure between the two surfaces causes the disc to deflect and move closer to the plate.

In summary, the distance separating the stationary and the rotating surfaces is controlled by a balance between the dynamic and the elastic forces of the rotating disc and the hydro-dynamic fluid forces under the disc. Thus, in any operating fluid of characteristic viscosity and density all of the following parameters may be varied to influence the separation spacing between surfaces; thickness of the disc, physical properties of the disc, geometry of the drive flanges and inside manifold; surface finish of the two surfaces, drive flange spacing with respect to stabilizing surface, angular velocity of the disc, diameter of the disc, and the volume of flow-through air permitted to enter between the disc and the stabilizing surface at the central manifold orifice.

Analysis of the basic underlying physical considerations involved in the rotation of the disc adjacent a smooth back plate indicate that the radial spacing of the disc from the periphery of the hub to the periphery of the disc will not be uniform. Uniformity of spacing between the recording medium and the transducer elements in the stabilizing plate is not necessarily desirable. Since the velocity of a point on the disc near the axis of rotation is significantly less than the velocity of a point near the disc's periphery, the resolution of the signals sensed by reading heads at the outer recording tracks will be considerably different from the signals produced by similar reading heads at tracks of smaller circumference if the separation between each of the heads and the recording surface is uniform. Signal uniformity can be achieved if the disc to stabilizing plate spacing increases outwardly from the center of the disc, so that the radial separation remains a constant fraction of the recorded wavelength.

There is a further and very considerable factor directly related to non-uniform spacing. The power input to drive the disc is a function of the spacing; the smaller the spacing between the disc and the back plate's surface, the greater the power required to rotate the disc. Accordingly, spacing the disc in a manner resulting in signal uniformity also results in decreasing the power required to drive the disc. In applications such as aircraft, missile or satellite instrumentation, low power requirements are essential. The essence of the improvement described herein is the provision of means for achieving uniform signal resolution and minimal power requirements to rotate the disc.

The invention resides in perforating the disc near its outer edge with a number of small holes and providing venting grooves or apertures in the facing surface of the back plate so that the separation between the disc's recording surface and the plate's facing surface increases with the radial distance from the disc's axis of rotation. By controlling the number of perforations in the disc and the venting action of the openings in the back plate, the disc's profile can be made to conform quite closely to an ideal profile.

The invention also lends itself to the prevention of "cross-talk" between adjacent transducer heads which are set into the back plate. In an effort to provide as many recording tracks as possible, the transducer heads have been densely packed on the back plate with the result that the magnetic field of one hand tends to influence the closely adjacent heads. Because the disc is so thin, a magnetic shield in the form of a plate can be placed on the side of the disc opposite from the back plate and positioned in close relationship to the disc. Thus any magnetic flux, emanating from a head, which penetrates through the disc is short circuited by the low reluctance path afforded by the shield and is prevented from extending into an area where it can effect the adjacent heads. The shield is perforated to permit free fluid circulation through it and does not affect the shape of the whirling flexible disc.

The construction of the invention together with its mode of operation can be better understood by a perusal of the following detailed exposition when considered in conjunction with the accompanying drawings in which.

Figures 1, 2:
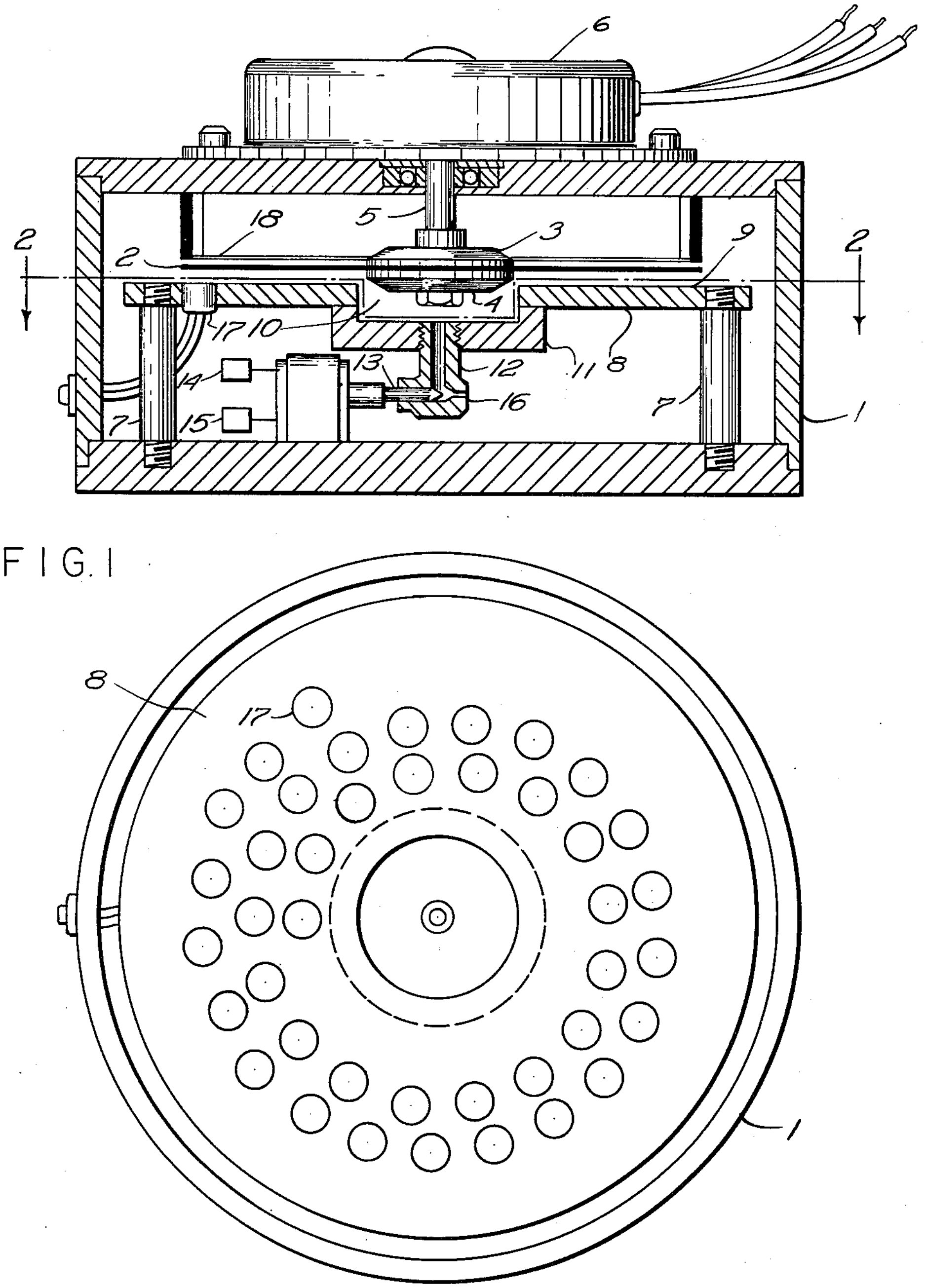
FIG. 1 is a sectional view of a magnetic disc recording device enclosed in a protective housing.
FIG. 2 is a view taken along the line 2—2 in FIG. 1 and shows an arrangement of transducer heads set into the back plate.

Referring now to FIG. 1 which depicts the magnetic disc recorder in an inverted position, there is shown a housing 1 in which a thin flexible disc 2 is suspended, the disc being clamped at its center between two flanges 3, 4 which are keyed to the shaft 5 of a motor 6. The disc is, preferably, a plastic sheet which has been coated on both surfaces with iron oxide, the sheet being so thin that it is highly pliant. A .002" thick mylar sheet has been found to be suitable for use in the magnetic recorder. Since the disc is rotated at a constant angular velocity, the motor 5 is an electric motor of the synchronous type although other types of motors can be employed so long as they meet the constant speed requirement. Supported within the housing by studs 7 is a stabilizing back plate 8 having a smooth planar surface 9 and a central aperture 10. The lower flange 4 fits within the central aperture and serves as the fluid flow control manifold. Secured to the under side of the back plate 8 and covering the central aperture 10 is a manifold cover plate 11. The cover plate 11 is provided with a valve 12 having an adjustable needle 13 for regulating the volume of air or other gas flowing through the valve's orifice, the position of the needle being regulated by a thermally sensitive device 14 and a pressure sensitive device 15.

When the disc 2 rotates at high speed and the surface of the disc is near the surface 9 of the back plate, the fluid in the housing is caused to flow in through the orifice 16 of valve 12 to the space between the flange 4 and cover plate 11, thence between the disc 2 and surface 9, and out at the periphery of the disc. For purposes of exposition, the fluid is assumed to be air although other gases can be employed. A plurality of transducer heads (which may be of the types described in Chapter 7 of Digital Computer Components and Circuits by R. K. Richards, published by D. Van Nostrand) for reading from and writing upon the disc's storage surface are set into the back plate 8 in a manner which does not interrupt the flatness of the surface 9, one such read-write head 17 being shown in FIG. 1.

FIG. 2 is a view taken along the line 2—2 of FIG. 1 and depicts a plurality of the read-write heads mounted in the back plate 8. The surfaces of the heads are flush with the surface 9 of the base plate 8. The heads are arranged along a helical path, each head reading and recording upon a separate circumferential track of the disc. Since the heads are at different distances from the center of disc rotation, the velocity at which the disc's surface passes each of the heads is different, the linear velocity being greatest at the rim of the disc and decreasing as the center of the disc is approached. It is well known that the magnitude of the output signal obtained from a reading head is a function of the rate of change of magnetic flux and the flux density, and therefore the heads furthest from the axis of disc rotation produce larger output signals for a given flux density. By increasing the separation between the recording head and the disc's surface the flux density acting on the head is, in effect, reduced. It is apparent, therefore, that in an ideal situation the spacing of the head from the disc's surface would vary directly with the radial distance of the head from the axis of rotation, the spacing being greatest near the disc's periphery and decreasing as the axis is approached.

Referring again to FIG. 1, a magnetic shield 18 is supported within the housing in a position near to the side of the disc opposite from the side facing the surface 9. The shield is essentially a flat plate of highly permeable magnetic material. In order not to impede the flow of fluid, the shield is perforated so that as much material as possible has been removed, except in the immediate area over each transducer head. The shield is separated from the whirling disc by a distance of one thirty-second of an inch ($\frac{1}{32}$") and at that distance there is no observable effect on the output signal obtained from the subjacent heads nor is there any observable effect on the disc separation from the back plate's surface 9.

Figure 5:
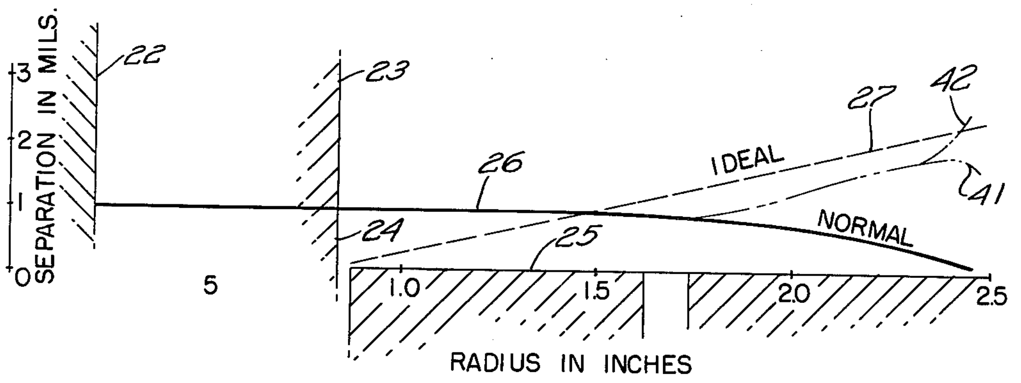
FIG. 5 depicts profiles of the flexible disc and illustrates the effect of venting holes in the back plate.
Figures 6, 7, 8:
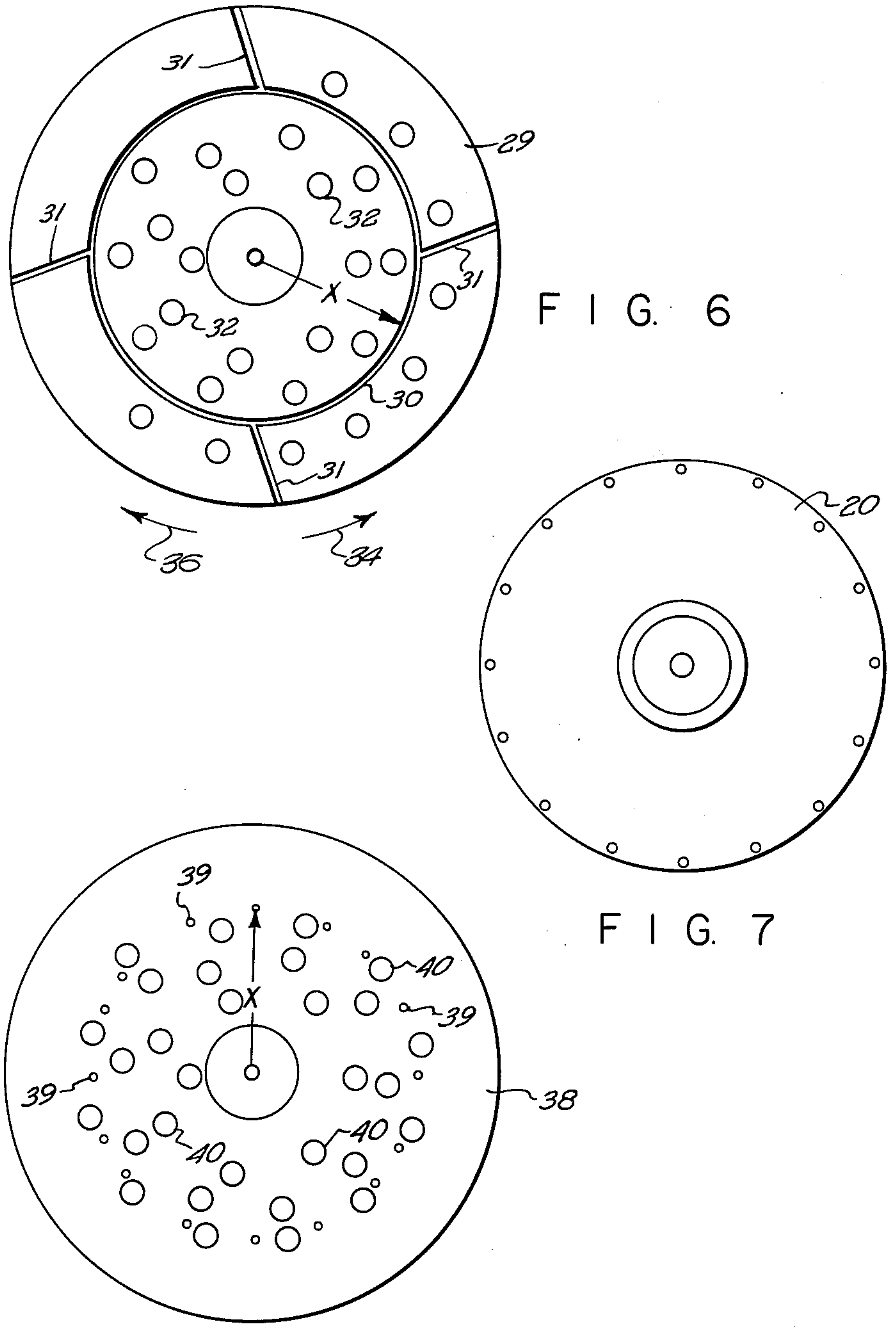
FIG. 6 illustrates a back plate constructed in accordance with the invention.
FIG. 7 illustrates a flexible disc having perforations symmetrically spaced adjacent its periphery.
FIG. 8 illustrates a back plate constructed in accordance with the invention.

So long as no part of the rotating disc touches the back plate and circular symmetry of the disc is maintained, the power required to drive the disc is given by the expression $$\text{Power}=2\pi\mu\omega^2\int_{R_1}^{R_2}\frac{R^3dR}{s}$$

where $\mu$=absolute viscosity of the gaseous medium
$\omega$=angular velocity
$R$=the radius of integration
$R_1$=the lower radial limit of integration
$R_2$=the upper radial limit of integration
$s$=separation between disc surface and back plate surface at the radius of integration
$dR$=radial increment From the expression above, it can be deduced that increasing the separation near the periphery of the disc has a considerable effect in reducing the power required, since the power required increases as a fourth power of the radius, whereas an increase in separation "*s*" affects the required power in inverse proportion to the increase. Various means have, therefore, been devised for causing the separation between the disc and the back plate to increase as the radial distance from the axis of rotation increases. FIG. 7 depicts a flexible disc 20 having sixteen perforations arranged adjacent the periphery in a manner preserving the disc's circular symmetry. The effect of the perforations is to cause the edge of the whirling disc to be lifted away from the back plate and the amount of lift is controlled by varying the number of perforations. The size of the perforations also affects the degree of lift. As few as four perforations have been tried and as many as forty perforations have been tried, the perforations being circular holes $\frac{1}{16}$" in diameter. In each trial, some lifting effect was observed. In general, the amount of lift can be increased by employing more than four perforations, 16 or 17 perforations having proven adequate. The spacing of the perforations inwardly from the edge of the disc is not a critical dimension, but the disc must present a continuous circular edge. The edge spacing of the perforations will depend somewhat on the material of which the disc is constituted since the perforations should not be so close to the edge that the stressing of the disc during rotation causes tearing. The lifting effect of the perforations is graphically depicted in FIG. 3. In each of FIGS. 3, 4, and 5, the line 22 represents the disc's axis of rotation, the lines 23 and 24 represent the outer extent of the flanges 3 and 4 between which the disc is clamped, the surface of the back plate is indicated at 25. In each of those figures the curve 26 labeled "Normal" is identical and represents the profile of an unperforated disc moving over the uninterrupted planar surface of the back plate. The line 27 labeled "Ideal" represents the disc profile for uniform signal resolution and minimal driving power. It will be noted that the ideal profile is a straight line whose separation from the back plate increases with the radial distance from the axis of rotation. The radius of the disc is 2.5 inches as indicated by the horizontal scale. The vertical scale, however, is calibrated in thousandths of an inch, a thousandth of an inch commonly being referred to as a mil, and the zero point on the vertical scale is the back plate's surface 25. The vertical scale has been enormously exaggerated relative to the horizontal scale since the actual separation between disc and back plate is almost undetectable by the eye, being in the order of one or two mils. It is evident in FIG. 3, that the "normal" profile of the disc is such that the separation is least at the disc's edge. Such a profile is distinctly undesirable since the amount of power required to drive the disc is greatly increased by the drooping disc's edge. By providing perforations in the disc in the manner shown in FIG. 7, the disc's edge is lifted away from the back plate, so that the modified profile of the disc is somewhat as shown by curve 28. Simply, by perforating the edge of the disc, a great reduction in the amount of power needed to drive the disc is effected. The reduction may be as high as 70 to 80% of the power needed with a "normal" disc. It will be noted, however, that the profile of the perforated disc is not altered sufficiently to conform to the "ideal."

In order to cause the profile of the disc to more closely approach the ideal profile, a back plate of the type shown in FIG. 6 is used in lieu of the flat back plate of FIG. 2. The back plate 29 has a circular groove 30 in its upper face with radiating inlet grooves 31 extending outwardly to the periphery of the plate. A number of transducer heads 32 are set into the back plate flush with the surface of the plate. The circular and radiating grooves are thirty mils (.030") in width and about 5 to 10 mils in depth. The inlet grooves 31 are non-radial, being set at an angle to an intersecting radial line. The circular groove has a radius approximately equal to two-thirds of the radius of the disc. The dimensions of the grooves and the radius of the circular groove 30 are not critical, but any change has an effect upon the profile of the disc.

Figure 4:
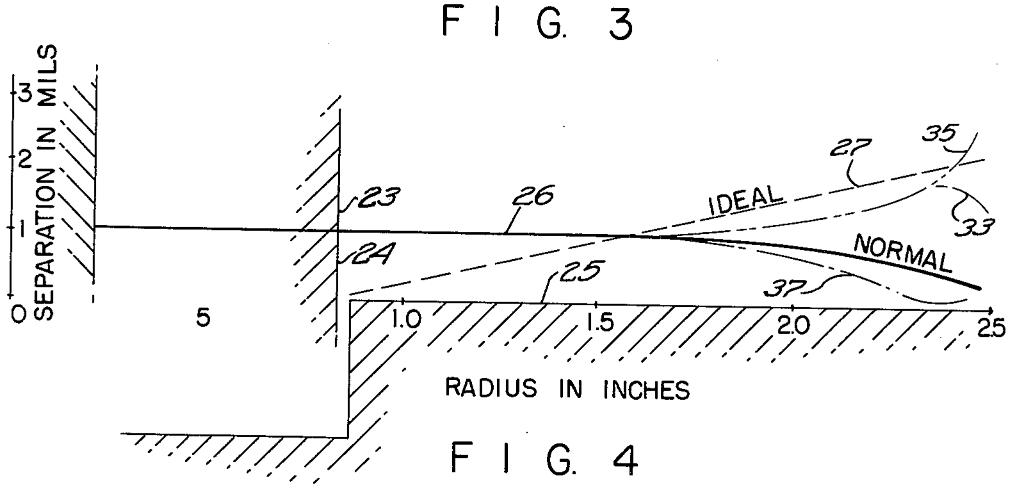
FIG. 4 depicts profiles of the flexible disc and shows the effect of non-radial grooves in the back plate.

FIG. 4 illustrates the effect of the grooved channels 30 and 31. With an unperforated disc, the back plate of FIG. 6 causes the disc's profile to be altered to conform to the curve 33, assuming the disc is rotated in the direction of arrow 34. With a perforated disc the profile is further altered by increased lift at the disc's edge as indicated by the curve 35. Should the direction of disc rotation be reversed (that is, when the disc is rotated in the direction indicated by arrow 36), the effect of grooved channels 30, 31 is also reversed causing the separation to decrease as indicated by the curve 37. However, the lifting action of the perforations in the disc is not affected by the direction of disc rotation as indicated by the upwardly lifted edge of profile 37. By a combination of the effects of the grooved channels 30 and 31 in back plate 29 and perforations in the disc 20, the profile of the disc is made to closely approach the ideal.

The ideal profile for the disc can also be closely approached by employing a back plate 38, of the type shown in FIG. 8, which utilizes a plurality of venting apertures 39 in lieu of the grooves 30 and 31. The apertures 39 are preferably 1/16" in diameter, although this size does not appear to be critical, and are spaced symmetrically about a circle having a radius "*x*" equal approximately to two-thirds of the disc radius. A number of transducer heads 40 are shown set in flush with the surface of the back plate. The heads may be packed much more densely than shown in FIG. 8, and the apertures 39, which vent to the under side of the back plate, may be moved slightly to accommodate the heads. Referring to FIG. 5, which illustrates the lifting effect of the venting apertures 39, the curve 41 illustrates the profile of an unperforated disc rotating above the back plate 38. When a perforated disc of the type shown in FIG. 7 is substituted, the profile is altered as indicated by the uplifted edge 42.

Although the flexible disc assemblies described hereinbefore apparently are restricted to cases in which symmetrical shaping forces result only from symmetrically disposed discontinuities in the path of fluid flow, such restriction is not essential to the proper operation of a flexible disc recorder. A moment's thought will make it clear that axial symmetry of the dynamic, elastic and fluid forces acting on a flexible disc in a magnetic recorder and an equilibrium between such forces may be attained with unsymmetrically disposed means for adjusting the forces on each unit area of a flexible disc. For example, the non-radial grooves 31 in the back plate 29 of FIG. 6 or the unevenly spaced venting apertures 39 in the back plate of FIG. 8, clearly show that any restriction of the invention to symmetrically disposed fluid pressure adjusting means is not essential and that, consequently, the cross-sectional shape of a flexible disc may be adjusted in an operating recorder by any fluid pressure adjusting means including those which are intentionally disposed unsymmetrically with respect to a flexible disc.

Figure 9:
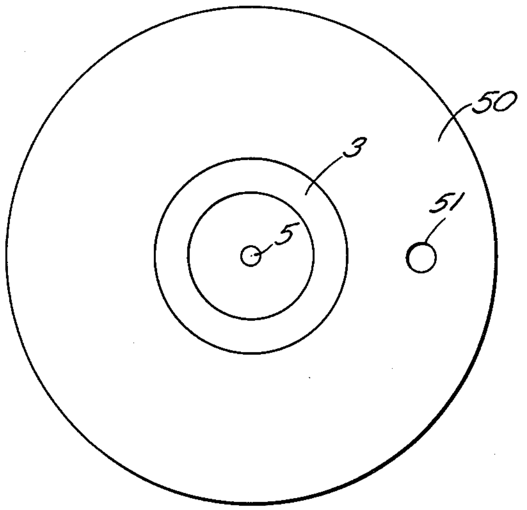
FIG. 9 illustrates a flexible disc having a single perofration.

The disc assembly illustrated in FIG. 9 may be used to obtain, in operation, a symmetrically adjusted fluid gradient between a back plate and a flexible disc having an unsymmetrically disposed opening, or aperture. Thus, the disc assembly shown in FIG. 9 consists of a flexible disc 50 supported on a shaft 5 by means of a pair of flanges 3, 4. A single aperture 51 is formed through the flexible disc 50 approximately midway between the center and outer edge thereof. When the disc assembly of FIG. 9 is substituted for the disc assembly shown in FIG. 1 and rotated, it will be found that the cross-sectional shape of the disc 50 will be as shown in FIG. 10.

It will be understood that the size, shape and position of the aperture 51 may be varied as desired, so long as it is recognized that the effect of the aperture 51 is to cause the separation between the disc 50 and the back plate 8 to increase radially outwardly from a circle somewhat closer to the axis of rotation than the circle defined by the inner edge of the aperture 51 in operation. It should also be recognized that the inclination, or slope, of the disc 50, with respect to the back plate 8, may here be considered to be, primarily, a function of the size, shape and position of the aperture 51. However, it will be obvious that the size, shape and position of the aperture 51 also has some effect on the distribution of the elastic and dynamic forces acting on the disc 50 and that the distribution of all the forces acting on the disc 50 must, perforce, be considered.

A complete mathematical analysis of the equilibrium condition for the disc shown in FIG. 9, may, if desired, be made to predict the cross-sectional shape of the disc 50. The techniques mentioned in the paper by R. T. Pearson entitled "The Development of the Flexible-Disk Magnetic Recorder" appearing in the "Proceedings of the IRE"; vol. 49, No. 1, January 1961, may be extended to cover any particular case. However, since the mathematical equations defining equilibrium conditions may, as pointed out in the cited article, not be solved by presently known direct methods it will be found advantageous in practice either to predict the cross-sectional shape of the flexible disc using known approximation techniques based on boundary layer theory or to determine empirically the best size, shape and location of an aperture such as aperture 51 to attain any desired cross-sectional shape of the disc 50.

Figure 3:
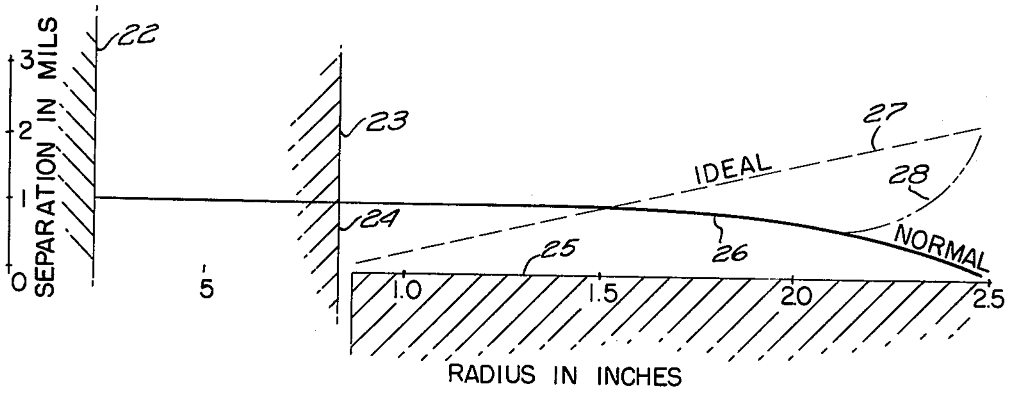
FIG. 3 depicts profiles of the flexible disc and illustrates the effect of perforations in the disc.
Figure 10:
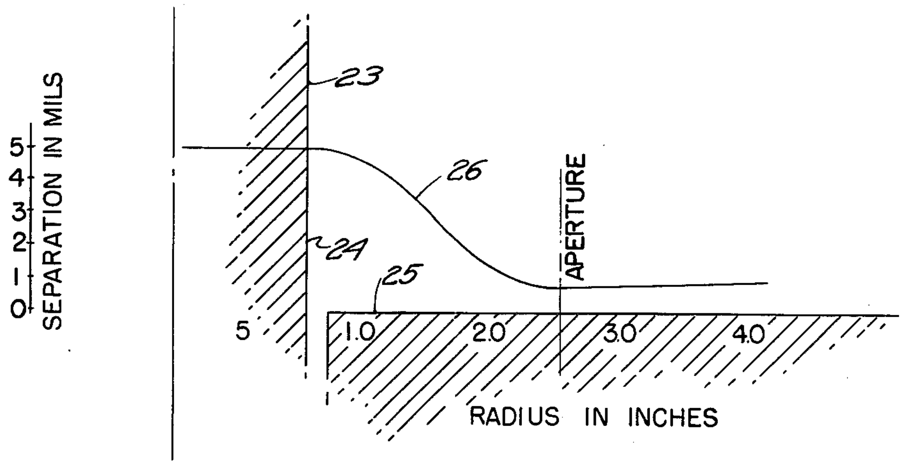
FIG. 10 depicts a profile of a flexible disc and illustrates the effect of the single aperture shown in FIG. 9 on the cross-sectional shape of the flexible disc.

It will be observed that the curvature of the inner portions and the peripheral portions of the disc shown in FIG. 10 differ from the curvature of the corresponding portions of the discs shown in FIGS. 3, 4, and 5. Such differences, the reasons for which are easily explained, merely point up the great range of adjustment in the cross-sectional shape of a disc which is possible with the various embodiments of the invention. In FIG. 10 it will be observed that the initial disc height (the vertical distance of the disc above the back plate measured along the axis of rotation of the disc), is approximately five times the initial disc height of any of the discs of FIGS. 3, 4 and 5. As noted in the Pearson paper hereinbefore cited, such a variation naturally results in a different curvature of the inner portions of a flexible disc, everything else being equal. The difference between the curvature of the peripheral portions of the disc shown in FIG. 10 and the discs shown in FIGS. 3, 4 and 5 may be attributed to the particular way in which the discs are made. That is, the disc of FIG. 10 is a balanced disc, having a coating of magnetizable material on both sides, whereas the discs of FIGS. 3, 4 and 5 are unbalanced in that a magnetizable material is deposited on one side only. Thus, in the disc used to obtain the shape shown in FIG. 10, the internal stresses and bending moments within the disc are balanced and the characteristic edge curl of the unbalanced disc is, for all practical purposes, eliminated.

It will be recognized, however, that even though the differences in cross-sectional shape obtained with the various illustrated embodiments of the invention are significant in the design of a working device, such differences do not mean that different basic principles govern the operation of any of the discs. In all cases, the cross-sectional shape of a disc is controlled primarily by introducing a fluid at a constant pressure into the space defined between a flexible disc and a back plate, causing the fluid to move through that space and, simultaneously, regulating the pressure gradient of the fluid as it moves between the flexible disc and the back plate to establish any desired equilibrium of dynamic, elastic and fluid forces on each unit area of the disc.

While preferred embodiments of the invention have been illustrated in the drawings, changes which do not depart from the essence of the inveniton may be made in the structures depicted and, indeed, are apparent to those skilled in the recording art. It is intended, therefore, that the scope of the invention be construed in accordance with the appended claims.

What is claimed is:

1. A magnetic recorder utilizing a flexible recording disc and a plurality of magnetic transducers, each one of the magnetic transducers having substantially the same sensitivity, comprising, means for mounting the flexible recording disc and each one of the plurality of magnetic transducers in a fluid, the magnetic transducers being disposed in a plane at different radial distances from the center of the flexible recording disc, means for rotating the disc to create dynamic, elastic and fluid forces to cause the disc to rotate at a small distance from the plane, and means for regulaitng the fluid pressure gradient between the disc and the plane to establish an equilibrium condition between the dynamic, elastic and fluid forces on the disc wherein the spacing between each one of the magnetic transducers and the surface of the disc is directly proportional to the radial distance of each one of the magnetic transducers from the center of the disc.

2. Data storage apparatus comprising a flexible disc having a magnetizable surface, a back plate having a substantially coextensive smooth surface facing the disc's magnetizable surface, the disc having a plurality of small perforations therethrough spaced symmetrically about a circle, the perforations being located adjacent the disc's edge, and means for rotating the disc to establish a relatively small continuous separation between the disc's magnetizable surface and the smooth surface of the back plate.

3. Data storage apparatus as in claim 2 wherein the flexible disc, the back plate and, additionally, a plurality of magnetic transducers are mounted in a fluid, each one of the magnetic transducers presenting a surface flush with the back plate's smooth surface at a different radial distance from the flexible disc's axis of rotation.

4. Data storage apparatus comprising a flexible disc having a magnetizable surface, a back plate having a substantially coextensive planar surface facing the disc's magnetizable surface, the disc having a plurality of small perforations therethrough spaced symmetrically about a circle adjacent the disc's edge, means for rotating the disc to establish a small continuous separation between the back plate's planar surface and the magnetizable surface, and means in the back plate for increasing the separation between an outer portion of the disc's surface and the back plate's planar surface.

5. Data storage apparatus comprising a flexible disc having a magnetizable surface, an annular back plate having a substantially coextensive planar surface facing the disc's magnetizable surface, the back plate having a circular groove in its planar surface with a plurality of non-radial grooves extending away from the circular groove toward the edge of the back plate, and means for rotating the disc to establish a small continuous separation between the disc's magnetizable surface and the planar surface of the back plate, the grooves causing the separation to vary with the radial distance from the axis of rotation.

6. Data storage apparatus as in claim 5 wherein each one of the plurality of non-radial grooves is inclined to the circular groove in the direction of rotation of the disc to cause the peripheral portions of the disc to bend away from the planar surface of the back plate.

7. Data storage apparatus as in claim 5 wherein each one of the plurality of non-radial grooves is inclined to the circular groove opposite to the direction of rotation of the disc to cause the peripheral portions of the disc to bend toward the planar surface of the back plate.

8. Data storage apparatus comprising a flexible disc having a magnetizable surface, an annular back plate having a substantially coextensive planar surface facing the disc's magnetizable surface, means for rotating the disc to establish a small continuous separation between the disc's magnetizable surface and the back plate's planar surface, and the back plate having a plurality of venting apertures therein causing the separation to increase with the radial distance from the axis of rotation.

9. Data storage apparatus as in claim 8 wherein the venting apertures are unsymmetrically disposed on the back plate's planar surface.

References Cited by the Examiner

UNITED STATES PATENTS

| | | | |
|---|---|---|---|
| 2,899,260 | 8/1959 | Farrand et al. | 340—174.1 X |
| 2,950,353 | 8/1960 | Fomenko | 340—174.1 X |
| 3,047,869 | 7/1962 | Marcum et al. | 340—174.1 |
| 3,108,259 | 10/1963 | Perkins et al. | 340—174.1 |
| 3,122,727 | 2/1964 | Marcum et al. | 340—174.1 |
| 3,131,395 | 4/1964 | Lekas | 340—174.1 |

IRVING L. SRAGOW, *Primary Examiner.*

STEPHEN W. CAPELLI, *Examiner.*